(12) United States Patent
Yamaga et al.

(10) Patent No.: US 7,590,792 B2
(45) Date of Patent: Sep. 15, 2009

(54) CACHE MEMORY ANALYZING METHOD

(75) Inventors: Masumi Yamaga, Kyoto (JP); Takanori Miyashita, Osaka (JP); Koichi Katou, Osaka (JP)

(73) Assignee: Panasonic Corporation, Osaka (JP)

( * ) Notice: Subject to any disclaimer, the term of this patent is extended or adjusted under 35 U.S.C. 154(b) by 316 days.

(21) Appl. No.: 11/515,751

(22) Filed: Sep. 6, 2006

(65) Prior Publication Data

US 2007/0055809 A1 Mar. 8, 2007

(30) Foreign Application Priority Data

Sep. 8, 2005 (JP) ............................. 2005-260950

(51) Int. Cl.
G06F 12/00 (2006.01)
G06F 13/00 (2006.01)
G06F 13/28 (2006.01)
G06F 12/08 (2006.01)

(52) U.S. Cl. .......................... 711/3; 711/118; 711/128; 711/133

(58) Field of Classification Search ...................... 711/3
See application file for complete search history.

(56) References Cited

U.S. PATENT DOCUMENTS

| 5,367,656 | A | | 11/1994 | Ryan |
| 5,630,097 | A | * | 5/1997 | Orbits et al. ................ 711/165 |
| 5,761,715 | A | | 6/1998 | Takahashi |
| 5,930,507 | A | | 7/1999 | Nakahira et al. |
| 6,129,458 | A | | 10/2000 | Waters et al. |
| 6,874,056 | B2 | * | 3/2005 | Dwyer et al. .................. 711/3 |

* cited by examiner

*Primary Examiner*—Christian P Chace
*Assistant Examiner*—Ryan Bertram
(74) *Attorney, Agent, or Firm*—McDermott Will & Emery LLP

(57) ABSTRACT

It is done to read information containing an address of a memory at which a cache miss is generated, from a cache memory. The numbers of cache misses generated at each cache miss generated address contained in the information are totalized. The cache miss generated addresses whose generated cache miss numbers are totalized are sectionalized by each of the sets. Further, the address group whose numbers of cache miss generated are consistent or close is extracted from a plurality of cache miss generated addresses divided as addresses in the same set.

11 Claims, 11 Drawing Sheets

FIG.8

Cache access information
36

| Access time | Access address |
|---|---|
| 100 | 0x91021e3c |
| 200 | 0x91021e34 |
| 300 | 0x91021e40 |
| 400 | 0x91021e41 |
| 500 | 0x91021dc4 |
| 600 | 0x91020ba0 |
| 700 | 0x91023240 |
| 800 | 0x91023240 |
| 900 | 0x91023248 |
| 1000 | 0x91023250 |
| 1100 | 0x91023258 |
| 1200 | 0x91023260 |
| 1300 | 0x91023268 |
| ⋮ | ⋮ |

FIG.9

| Set | Address | Number of cache misses |
|---|---|---|
| 0 | 0x90000800 | 150 |
| 0 | 0x90000000 | 90 |
| 0 | 0x90000C00 | 50 |
| 0 | 0x90000200 | 50 |
| 0 | 0x90000600 | 50 |
| 0 | 0x90005300 | 48 |
| 0 | 0x90000D00 | 25 |
| 0 | 0x90002400 | 18 |
| 0 | 0x90008500 | 18 |
| 0 | 0x90004100 | 16 |
| 0 | 0x90004A00 | 8 |
| 0 | 0x9000AF00 | 7 |

A: rows 1–6 (0x90000800 through 0x90005300)
B: rows 7–9 (0x90000D00 through 0x90008500)
C: rows 10–12 (0x90004100 through 0x9000AF00)

| Set | Address | Number of cache misses |
|---|---|---|
| 1 | 0x90000210 | 110 |
| 1 | 0x90007310 | 62 |
| 1 | 0x90006A10 | 60 |
| 1 | 0x9000AF10 | 60 |
| 1 | 0x90000810 | 57 |
| 1 | 0x90002D10 | 30 |
| 1 | 0x90006710 | 30 |
| 1 | 0x9000B510 | 5 |
| 1 | 0x90003910 | 2 |

D: rows 1–5
E: rows 6–7
F: rows 8–9

FIG.10

Set 0

| Address group A | Number of misses |
|---|---|
| 0x90000C00 | 50 |
| 0x90000200 | 50 |
| 0x90000600 | 50 |
| 0x90005300 | 48 |

Number of addresses:4   Total:198

| Address group B | Number of misses |
|---|---|
| 0x90002400 | 18 |
| 0x90008500 | 18 |
| 0x90004100 | 16 |

Number of addresses:3   Total:52

| Address group C | Number of misses |
|---|---|
| 0x90004A00 | 8 |
| 0x9000AF00 | 7 |

Number of addresses:2   Total:15

Set 1

| Address group D | Number of misses |
|---|---|
| 0x90007310 | 62 |
| 0x90006A10 | 60 |
| 0x9000AF10 | 60 |
| 0x90000810 | 57 |

Number of addresses:4   Total:239

| Address group E | Number of misses |
|---|---|
| 0x90002D10 | 30 |
| 0x90006710 | 30 |

Number of addresses:2   Total:60

| Address group F | Number of misses |
|---|---|
| 0x9000B510 | 5 |
| 0x90003910 | 2 |

Number of addresses:2   Total:7

CACHE MEMORY ANALYZING METHOD

BACKGROUND OF THE INVENTION

1. Field of the Invention

The present invention relates to a cache memory analyzing method for detecting an address where a cache miss is generated due to memory access contention in a processor having a cache memory loaded thereon or a simulated information processing apparatus and the like that simulates the processor.

2. Description of the Related Art

In a system such as a processor or a simulated information processing apparatus (simulator), latency generated due to a cache miss in requesting data is one of the most serious bottlenecks. Thus, in order to improve the execution performance in an embedded system that works on the processor and the information processing apparatus, it is important how the cache miss is reduced. For effective reduction of the cache miss, it is necessary in the above-described system to specify the memory access data that exhibits a high efficiency for reducing the cache miss.

Conventionally, there is known a method (1) for specifying the memory access data having a high efficiency for reducing the cache miss. It is a method where the numbers of cache misses generated in addresses of each memory access are calculated, and the address with the largest number of cache misses is detected as the memory access data with the high efficiency for reducing the cache miss.

FIG. 11 shows an example of the detection method (1). FIG. 11 illustrates the access state of the cache memory. The cache memory whose access state is shown in FIG. 11 is of a set associative system having two ways. In FIG. 11, the horizontal axis is a lapse of access time of the cache memory and the vertical axis indicates data at the addresses in the same set. The "set" indicates an index (entry) that is distinguished form other memory areas by the several lower bits of the memory-access addresses, and the "way" indicates how many block (cache block) there is for storing the data within the cache memory. In FIG. 11, five data from a to e are accessed in the set 0, and three data from $\alpha$ to $\gamma$ are accessed in the set 1. Since the address with the largest number of cache misses is considered as the memory access data having the high efficiency for reducing the cache miss, the data a in the set 0 having the cache misses generated six times is detected in FIG. 11 as the memory access data with the high efficiency for reducing the cache miss.

Further, U.S. Pat. No. 5,930,507 discloses a method (2) for specifying the memory access data that may have contention. The method collects the memory access data on the cache memory in a compile processing apparatus that works on a calculator having the cache memory, and analyzes the relation of contention generated between the data.

In the method (1), the address with a large number of cache misses is calculated about the addresses of each memory access where the cache miss has been generated, without considering the access contention of the cache memory. Thus, the address with the high efficiency for reducing the cache miss may not be detected. "Contention" means repetition of the state where one of the different addresses in the same set of the cache memory boots off the other from the cache memory or the one is booted out by the other from the cache memory.

The aforementioned inconveniences will be described referring to FIG. 12A and FIG. 12B. These figures show the access state of the cache memory as FIG. 11. FIG. 12A shows the state where the cache misses are reduced in the data "a" of the set 0 in FIG. 11 by changing the address arrangement or the like. FIG. 12B shows the state where the cache misses are reduced in the data a of the set 1 in FIG. 11 by changing the address arrangement or the like.

As shown in FIG. 12A, by changing the address arrangement of the data "a" with the largest number (six) of cache misses, the total number of cache misses can be reduced from 30 times to 22 times.

As shown in FIG. 12B, however, the total number of cache misses can be reduced from 30 times to 15 times by changing the address arrangement of the data $\alpha$ with five times of the cache misses. This is because the contention of the memory access in the set 1 is eliminated by changing the address arrangement of the data "$\alpha$" and the number of cache miss in the set 1 becomes zero as access contention of the memory is generated among the three data "$\alpha$", "$\beta$", "$\gamma$" in the set 1. In this case, it can be considered that the data "$\alpha$" with the five time of cache misses has a higher efficiency for reducing the cache miss than the data a with six-time cache misses. Like this, there are cases where the efficiency for reducing the cache miss is high even though the number of generated cache misses is small.

The method (2) discloses a method to analyze access contention of the cache memory only for an arrangement element where the address in loop processing at the time of compilation can be recognized statically by a compiler. However, since the access contention of the cache memory is statically analyzed at the time of compilation in this method, the access state of the cache memory in actual operation is unknown.

SUMMARY OF THE INVENTION

The main object of the present invention therefore is to provide a cache memory analyzing method for detecting the memory-access address having the high efficiency for reducing the cache miss, while defining the access state of the cache memory by collecting cache access information in the actual operation after compilation.

In order to achieve the foregoing object, the cache memory analyzing method according to the present invention is a method for analyzing busy condition of a cache memory in a processor that comprises the cache memory of a set associative system having a plurality of data storage blocks for each set that is distinguished from other memory areas by a lower bit of a memory-access address and a CPU for performing recording control of the cache memory. The method comprises steps of:

a reading step for reading, from the cache memory, a recorded information on an address of the memory at which a cache miss is generated;

a totalizing step for totalizing numbers of cache misses generated at each address with generation of cache miss contained in the information;

a sectionalizing step for sectionalizing, by each set, the addresses with generation of cache miss where numbers of the generated cache miss are totalized; and an extraction step for extracting an address group which is consistent or close in the generated numbers of cache miss from a plurality of addresses with generation of cache miss classified as addresses of a same set.

According to this, it is highly possible that contention of memory accesses is generated in the addresses which are consistent or close to each other in the generated numbers of cache miss at the plurality of addresses with generation of cache miss classified as being in the same set (entry). Based on this judgment, the cache miss generated addresses having the same or similar cache miss generated numbers can be considered as the cache miss generated address having a high efficiency for reducing the cache miss.

In the extraction step, it is preferable to: set a threshold value as an upper limit for a difference between the cache miss generated numbers; sectionalizes the cache miss generated addresses sectionalized as addresses in a same set based on whether or not the difference falls in the range; and consider the cache misses generated addresses within the range as an address group whose cache miss generated numbers are close.

According to the above-described constitution, it becomes possible to specify the cache miss generated addresses having relatively high efficiency for reducing the cache miss by judging as highly possible to have memory access contention between each of the cache miss generated addresses where the numbers of generated cache misses are not only consistent but also falls within the approximate threshold value. Further, it is possible to adjust a number of the specified cache miss generated address by changing the threshold value.

Further, in the extraction step, it is preferable to sectionalize the plurality of address groups by arranging them in parallel in order of numbers of the addresses contained in the address groups when a plurality of the address groups within a same set is extracted.

When the cache miss generated at one of the addresses belonging to the address group is solved by changing the address arrangement or the like, there is a possibility that the cache misses at the other addresses in the group are solved simultaneously. In such case, it is considered that the smaller the number of addresses contained in the relevant address group is, the higher the possibility of solving the cache misses generated at other addresses is. The above-described constitution has been thought based on this viewpoint. According to this constitution, it is possible to specify the address group containing the smallest number of addresses as the address group having the highest efficiency for reducing the cache miss.

Further, in the extraction step, it is preferable to sectionalize the address groups with the same number of addresses by arranging them in parallel in order of total value in totalizing numbers of the respective cache misses generated at addresses contained in the relevant address groups when the plurality of address groups containing the same number of addresses within a same set is extracted.

According to this, the address group with the largest total number of cache misses generated at the addresses contained therein, which are totalized by each address group, can be specified as the address group having the highest efficiency for reducing the cache miss even when there are a plurality of address groups containing the same number of addresses in the same set.

Furthermore, it is preferable to further comprise a display step for displaying an extraction result of the address group through the extraction step as an analyzing result, wherein,
in the display step, it is preferable that the address group considered as having the least number of addresses in the extraction step is displayed emphatically as an address group with the high efficiency for reducing the cache miss.

According to this, the memory access data having the high efficiency for reducing the cache miss can be judged visually.

Moreover, it is preferable to further comprise a designating step for designating numbers of the data storage blocks for each of the sets as a pre-processing of the extraction step, wherein,
in the extraction step, when there are a plurality of address groups sectionalized as being in the same set, the plurality of address groups are sectionalized by giving high priority to the address groups that have a value of 1 or less when the data storage block number is subtracted from the address number contained in each of the address groups.

When the cache miss generated at one of the addresses belonging to the address group is solved by changing the address arrangement or the like, there is a possibility that the cache misses generated at the other address in the group are solved simultaneously. In such case, it is considered in the cache memory of the set associative system that it is highly possible for the cache misses at the other addresses to be solved simultaneously when the difference between the number of addresses having memory access contention and the number of the data storage blocks in each set is 1 or less. The above-described constitution has been thought based on this viewpoint. According to this constitution, the address group in which the difference between the number of the addresses having memory access contention and the number of the data storage blocks in each set is 1 or less can be specified as the address group having the highest efficiency for reducing the cache miss. This constitution is also effective for a processor having the cache memory in which the numbers of the data storage blocks in each set can be changed or for a simulating information processing apparatus of the processor.

Further, in the extraction step, in the case where there are a plurality of address groups that have a value of 1 or less when the data storage block number is subtracted from the address number contained in each of the address groups, it is preferable to sectionalize the plurality of address groups by arranging them in parallel in order of the total value in totalizing numbers of cache misses generated at the addresses for each of the address groups.

According to this, the address group with the largest total number of cache misses generated at the addresses contained therein, which are totalized by each address group, can be specified as the address group having the highest efficiency for reducing the cache miss even when there are a plurality of address groups that have a value of 1 or less when the data storage block number is subtracted from the address number contained in the same set.

Furthermore, it is preferable to further comprise a display step for displaying an extraction result of the address group extracted in the extraction step as an analyzing result, wherein,
in the display step, the address group classified as having a high priority in the extraction step is displayed emphatically as an address group with a high efficiency for reducing cache miss.

Moreover, a processor and a simulating information processing apparatus according to the present invention comprise: a CPU; a cache memory of a set associative system having a plurality of ways; and a cache-miss-address output unit for outputting an address of the data, as a cache-miss address to outside the processor or to a file system, when there is no data when the data is requested by the CPU. According to this, it becomes possible to obtain the cache-miss address from the processor and the simulating information processing apparatus when the cache miss is generated.

According to the present invention, it is possible to specify the addresses having memory access contention only based on the cache access information at the actual operation after compiling and to detect the memory access data having a high efficiency for reducing the cache miss.

The technique of the present invention allows detection of the memory access data having the high efficiency for reducing the cache miss as long as the address can be obtained when the cache miss is generated. Thus, it is effective for improving the processing performance and the like by reducing the cache miss in developing software.

BRIEF DESCRIPTION OF THE DRAWINGS

Other objects of the present invention will become clear from the following description of the preferred embodiments and the appended claims. Those skilled in the art will appreciate that there are many other advantages of the present invention possible by conducting the present invention.

FIG. 8 is an illustration for describing cache access information outputted from the processor/simulating information processing apparatus according to the embodiment of the present invention;

FIG. 9 is an illustration for describing the result of sectionalizing processing in a descending order of the number of generated cache misses in the embodiment of the present invention;

FIG. 10 is an illustration for describing the result of address extraction processing according to the embodiment of the present invention.

DETAILED DESCRIPTION OF THE INVENTION

Preferred embodiments of the present invention will be described hereinafter by referring to the accompanying drawings.

FIRST EMBODIMENT

Figure 1:
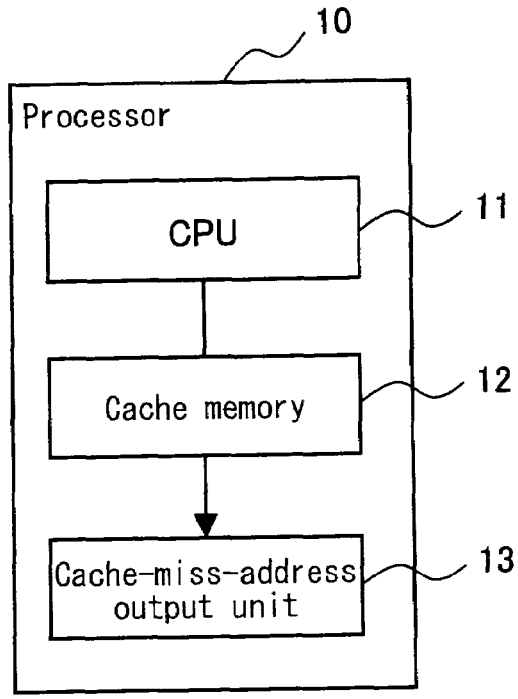
FIG. 1 is a block diagram for showing the structure of a processor according to an embodiment of the present invention, which is capable of outputting cache-miss access.

FIG. 1 shows a schematic view of a processor 10 according to an embodiment of the present invention and a system thereof that outputs cache access information having a record of addresses with cache misses.

In FIG. 1, the processor 10 comprises a CPU 11, a cache memory 12, and a cache-miss-address output unit 13. The cache memory 12 has a structure of a set associative system with a plurality of ways. When a cache miss is generated at the time of requesting data to the cache memory 12, the cache-miss-address output unit 13 outputs the address of data where the miss is generated as the cache-miss address to the outside the processor. By having the above-described structure, the processor 10 becomes capable of analyzing the busy condition of the cache memory only by the address where the cache miss is generated.

Figure 2:
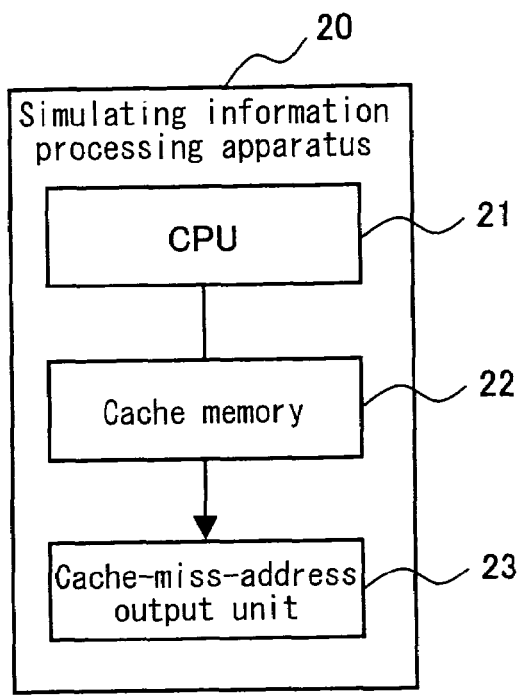
FIG. 2 is a block diagram for showing the structure of a simulating information processing apparatus for simulating the processor according to the embodiment of the present invention.

FIG. 2 shows a simulating information processing apparatus 20 that simulates the structure shown in FIG. 1. The simulating information processing apparatus 20 comprises a CPU 21, a cache memory 22, and a cache-miss-address output unit 23. The CPU 21, the cache memory 22, and the cache-miss-address output unit 23 comprise the same structures as the CPU 11, the cache memory 12, and the cache-miss-address output unit 13. Thereby, the above-described processor 10 can be replaced with the simulating information processing apparatus 20.

Figure 3:
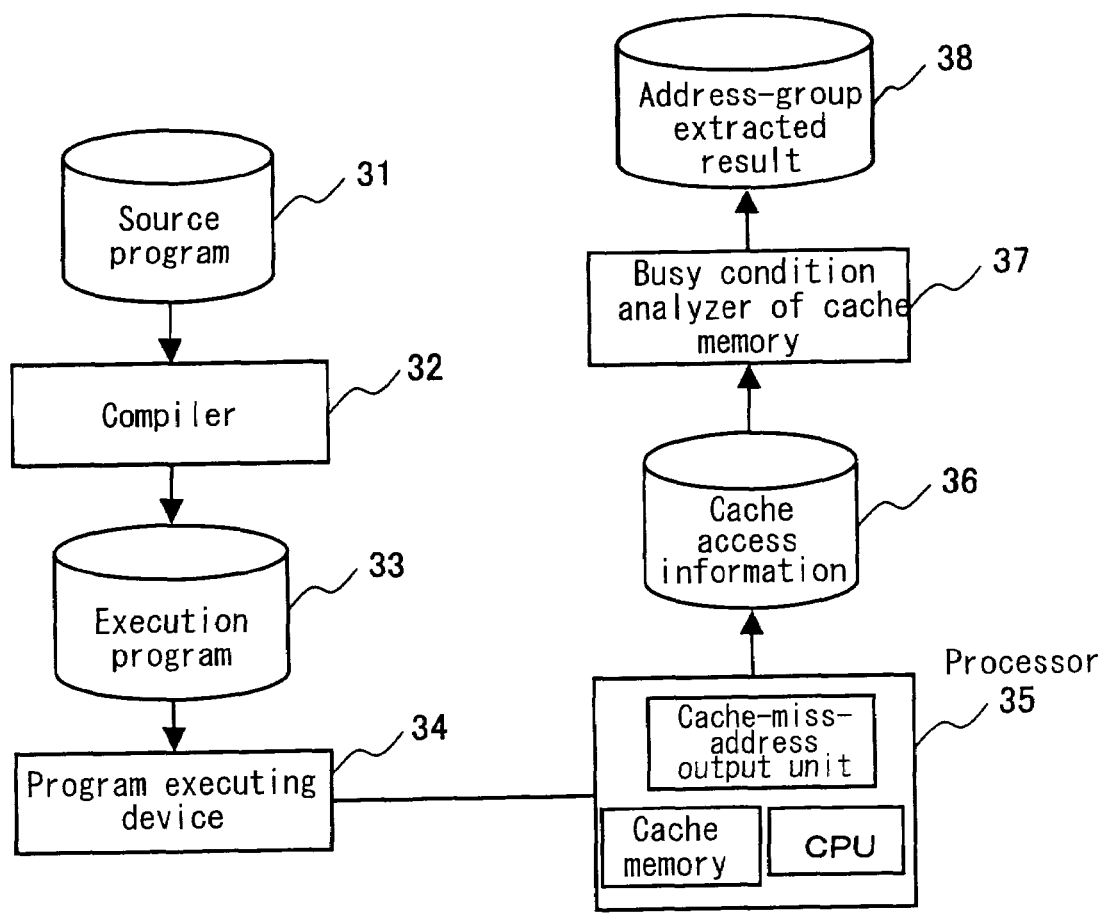
FIG. 3 is a data flowchart for showing the flow of data for calculating an index for reducing the cache miss according to the embodiment of the present invention.

FIG. 3 shows the flow of data for calculating the index for reducing the cache miss. A prepared source program 31 is converted into an execution program 33 by a compiler 32, which is then installed to a program execution device 34 that executes the execution program 33.

The program execution device 34 is connected to a processor 35. When executing the execution program 33, the CPU requests data to the cache memory in the connected processor 35. When there is generated a cache miss in this state, the cache-miss-address output unit outputs the address of data caused the cache miss to the outside the processor as cache access information 36.

FIG. 8 shows the cache access information 36 outputted from the processor 35. The cache access information 36 outputted from the processor 35 is analyzed by a busy condition analyzer for cache memory 37 which analyzes the busy condition of the cache memory. The busy condition analyzer for cache memory 37 extracts a group of memory-access addresses with a high efficiency for reducing the cache miss, and outputs the extracted address group as address-group extracted result 38.

Figure 4:
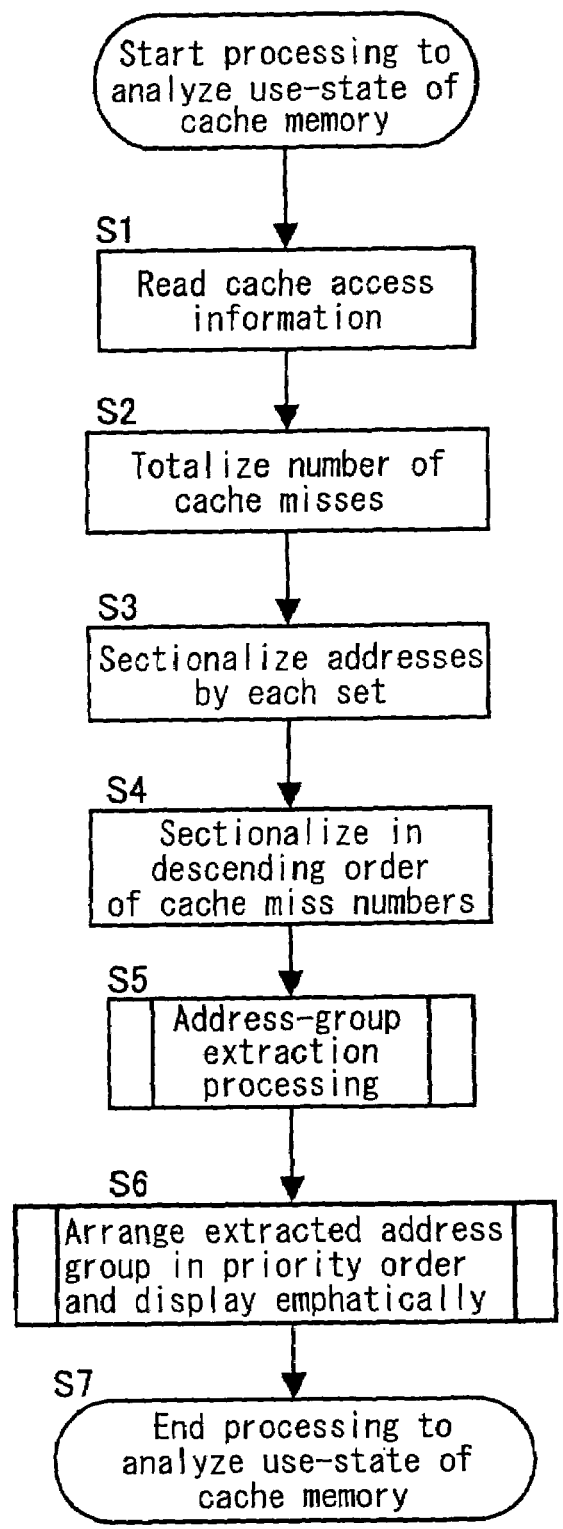
FIG. 4 is a flowchart for analyzing the busy condition of the cache memory according to the embodiment of the present invention.

FIG. 4 shows the flow for analyzing the busy condition of the cache memory by the busy condition analyzer for cache memory 37 shown in FIG. 3. In step S1, the cache access information 36 is read and, in step S2, the number of generated cache misses in each address is totalized. In step S3, each address after counting are sectionalized into each corresponding set. In step S4, the corresponding addresses are sectionalized in a descending order in accordance with the numbers of generated cache misses that are compiled in step S2.

FIG. 9 shows the sectionalized result of step S4. In FIG. 9, the addresses are sectionalized by each set, and the sectionalized addresses are arranged in a descending order of the numbers of the generated cache misses. The two lowest figures of the addresses in the set 0 are "00", while the two lowest figures of the addresses in the set 1 are "10".

In step S5, the address group is extracted using the sectionalized result obtained in step S4. That is, the numbers of generated cache misses are compared in each set. If a difference between the numbers of generated cache misses is within a range of prescribed threshold value, it is judged that a cache miss is caused due to contention of the memory accesses, and that address group is extracted.

In step S6, the address group extracted in step S6 is rearranged in the order of priority and it is displayed emphatically. In step S7, the analyzing processing of cache-memory use state is ended and the address-group extracted result 38 is outputted.

In the cache-memory use-state analyzer that executes the above-described processing, the structure for executing step S1 corresponds to a reading device, the structure for executing step S2 to a tabulation device, the structure for executing step S3 to a sectionalizing device, and the structure for executing step S5 to an extracting device. Basically, these structures consist of software of a computer.

Figure 5:
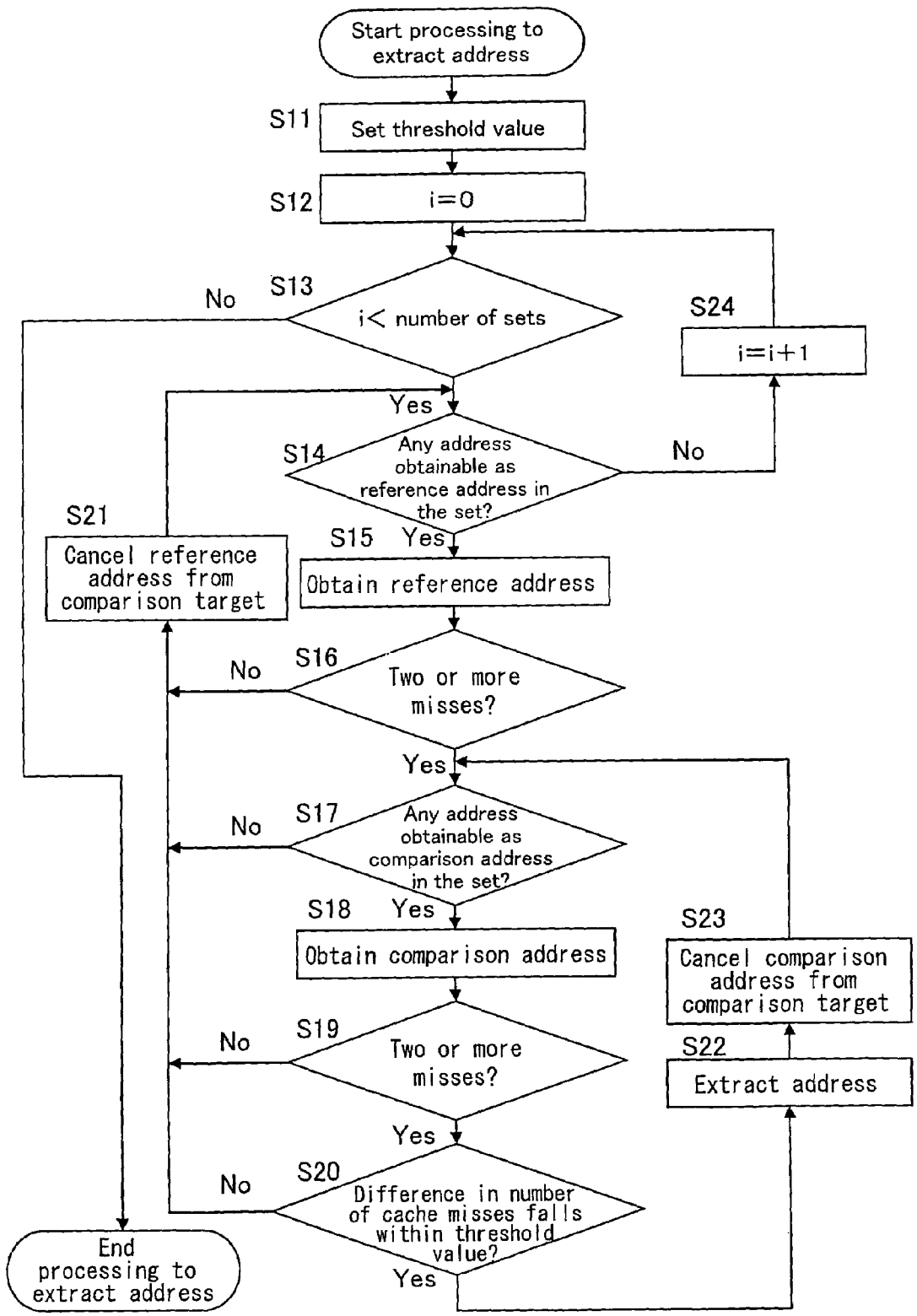
FIG. 5 is a flowchart for showing the detail of address extraction processing according to the embodiment of the present invention.

FIG. 5 shows the detail of step S5 for extracting the addresses. The address extraction processing is described by referring to the result shown in FIG. 9. First, a threshold value is set in step S11. This threshold value is the aforementioned threshold value, which is the threshold value of a difference between the numbers of generated cache misses. It is assumed here that the threshold values is set as "5". In step S12, initialization is performed for enabling the processing of step S14 and thereafter to be carried out as much as the number of sets that constitute each address. The "initialization" is processing for resetting a continuous number i (i=0). The continuous number i indicates the number of sets on which the address extracting processing has been completed. After resetting the continuous number i, it is judged in step S13 whether or not the continuous number i (the number of sets that has been extracted) is smaller than the number of sets in the cache memory 12 (i<the number of sets). Normally, the continuous number i is smaller than the set number (i<the number of sets) at the time of starting the processing, the numbers of generated cache misses are compared between the addresses in the same set sectionalized in step S3, by carrying out the processing of step S14 and thereafter.

In step S14, it is judged whether or not there is an address that can be obtained as a reference address in the set as a process target (the set 0 in FIG. 9 at the beginning of the processing). When judged in step S14 that there is no address that can be obtained as the reference address in the process-target set, it proceeds to step S24. In step S24, "1" is added to the continuous number i and the processing of step S13 and S14 described above is carried out again.

Meanwhile, when judged in step S14 that there is an address that can be obtained as the reference address, it proceeds to step S15 to obtain the reference address and then proceeds to step S16. It is assumed here that the address 0x90000800 is obtained as the reference address.

In step S16, it is judged whether or not the number of misses generated at the obtained reference address is twice or more. Assuming that the reference address is 0x90000800, the number of generated misses is a hundred and fifty times, which is judged as true in step S16. Then, it proceeds to step S17.

When numbers of the miss generated at the obtained reference address is zero or one and it is judged as false in step S16, the obtained address is considered inappropriate to be set as the reference address for detecting contention of the memory accesses. Thus, it proceeds to step S21. In step S21, the address obtained as the reference address is canceled from the reference target and the process returns to step S14.

In step S17 proceeded when judged as true in step S16, it is judged whether or not there exist an address that can be obtained as a comparing address in the set as a process target (the set 0 in FIG. 9 at the beginning of the processing). When judged in step S17 that there is no address that can be obtained as the comparing address, it proceeds to step S21. As the processing of step S21 is described previously, the description thereof is omitted here.

When judged in step S17 that there is an address that can be obtained as the reference address, it proceeds to step S18 to obtain the comparing address and then proceeds to step S19.

It is assumed here that the address 0x90000000 positioned next the reference address (0x90000800) is obtained as the comparing address.

In step S19 it is judged whether or not the number of misses generated at the obtained comparing address is twice or more. Assuming here that the comparing address is 0x90000000, it is judged as true in step S19 as the number of generated misses is ninety times. Then, it proceeds further to step S20.

When numbers of the miss generated at the obtained comparing address is zero or one, the obtained address is considered inappropriate to be set as the comparing address for detecting contention of the memory accesses when it is judged as false in step S19. Thus, it proceeds to step S21. As the processing of step S21 is described above, the description thereof is omitted here.

In step S20, it is judged whether or not the difference between the numbers of misses generated at both addresses is within the range of the threshold value. The threshold value is the value set in advance in step S11, and it is "5" in the above-described case. When it is assumed that 0x90000800 is the reference address and 0x90000000 is the comparing address, the difference between the numbers of cache misses at both addresses is "60". The difference "60" between the cache misses generated at both addresses in this case is out of the range of the threshold value "5". Thus, it is judged that there is no contention of the memory accesses generated between the reference address and the comparing address.

When judged in step S20 that there is no memory access contention, it proceeds to step S21. As the processing of step S21 is described above, the description thereof is omitted here.

Next, the processing of step S14 is described that is carried out again when it is judged in steps S16, S17, S19, S20 that the addresses obtained as the reference address and comparing address are inappropriate as the comparison targets or there is no memory access contention generated between the obtained reference address and comparing address.

When it is assumed that the first address, 0x90000800, is obtained as the reference address in the previous step S14, as there are addresses in the set 0 as the second address and thereafter, which can be obtained as the reference address, the result of judgment in step S14 this time is true. Then, it proceeds to step S15 where the second address 0x90000000 positioned next the first address 0x90000800 is obtained as the reference address. In step S16, as the number of cache misses generated at the reference address (0x90000000) of this time is ninety times, it is judged as true and then it proceeds to step S17. In this case, as the address that can be obtained as the comparing address exist in the set 0, the result of judgment in step S17 is true. Thus, it proceeds to step S18 where the third address 0x90000C00 positioned next the second address 0x90000000 is obtained as the comparing address.

The process proceeds further to step S19 where it is judged whether or not the number of misses generated at the obtained comparing address is twice or more. Assuming that the comparing address is 0x90000C00, as the number of generated misses is fifty times, it is judged as true in step S19 and then, it proceeds further to step S20 where the difference between the numbers of cache misses generated at both addresses is compared to the threshold value. The difference between the numbers of cache misses generated at the reference address 0x90000000 and the comparing address 0x90000C00 is "40", which is out of the range of the threshold value "5" that is set in step S11. Therefore, it is judged in this case that there is no memory access contention generated between the reference address and the comparing address.

When it is judged in step S18 that there is no memory access contention, the reference address obtained in step S19 is cancelled from the comparison target. Then, the process c returns to step S14 and the above-described processing is repeated.

In the set 0, for example, when the third address 0x90000C00 is obtained as the reference address and the fourth address 0x90000200 as the comparing address respectively, the difference between the numbers of cache misses generated at those addresses is "0", which is within the range of the threshold value "5". In that case, it is judged that there is memory access contention generated between the reference address and the comparing address and then the process proceeds to step S22. In step S22, the reference address and the comparing address at that time are extracted as the addresses having memory access contention. Then, it proceeds further to step S23 to cancel the comparing address (the address 0x90000200 in the above-described case) from the comparison target, and returns to step S17 to continue the series of processing.

The above-described processing is continued until the continuous number i become same as the number of sets constituting the cache memory 12 (i=the set number). "That the continuous number i become same as the number of sets" means that the address extraction processing is completed in all the addresses in that set. When it is judged in step S13 that the continuous number i is same as the number of sets, the series of processing is ended.

Through this flow, it is possible to extract the address group that has memory access contention by comparing whether or not the numbers of generated cache misses are consistent. Further, it becomes possible to calculate the memory-access address having a high efficiency for reducing the cache miss. Furthermore, it is possible to change the setting of threshold value in accordance with the state of cache miss by providing the threshold value when comparing the numbers of generated cache misses. Thereby, it becomes possible to calculate the memory-access address having a high efficiency for reducing the cache miss not only when the numbers of the generated cache misses are consistent but also when the numbers of the generated cache misses are about the same.

FIG. 10 shows a result of the address group extracted by the address extraction processing as shown in FIG. 5. The address group A of the set 0 is constituted with four addresses, the address group B with three addresses, and the address group C with two addresses. The differences between the numbers of generated cache misses with respect to each other are all "5" or less. At the address 0x90000D00 in FIG. 9, the number of generated cache misses is "25". At the precedent address thereof, i.e. 0x90005300, the number of generated cache misses is "48", and at the following address thereof, i.e. 0x90002400, the number of generated cache misses is "18". As mentioned above, at the address 0x90000D00, the differences between the numbers of generated cache misses with respect to the adjacent addresses in terms of the order exceed "5". Therefore, it is not listed in FIG. 10 as the extracted address group.

The address group D of the set 1 is constituted with four addresses, the address group E with two addresses, and the address group F also with two addresses. The differences between the numbers of generated cache misses with respect to each other are all "5" or less.

Figure 6:
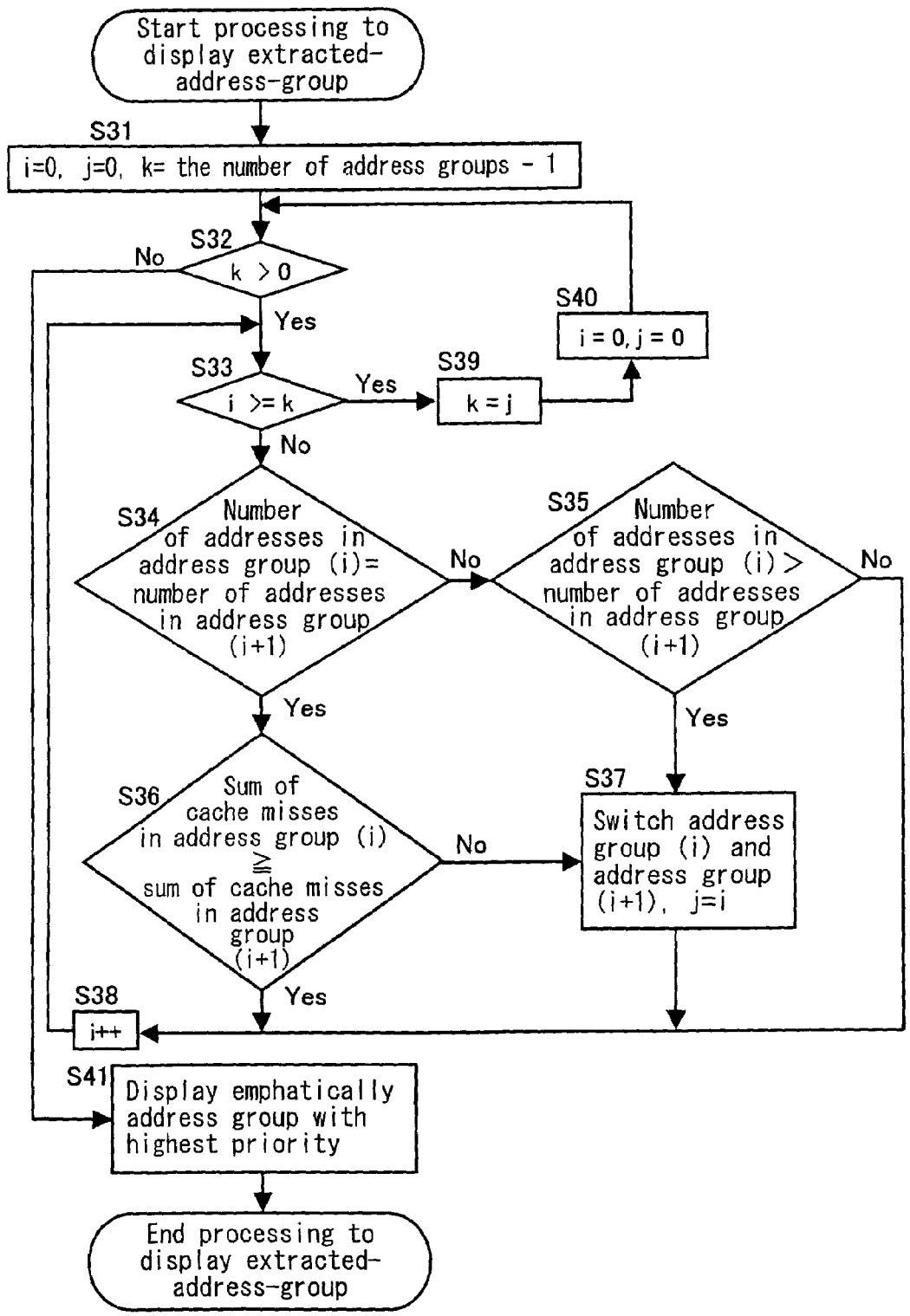
FIG. 6 is a flowchart of display processing for extracted-address-group according to the embodiment of the present invention, considering the number of addresses in the extracted-address group.
Figure 7:
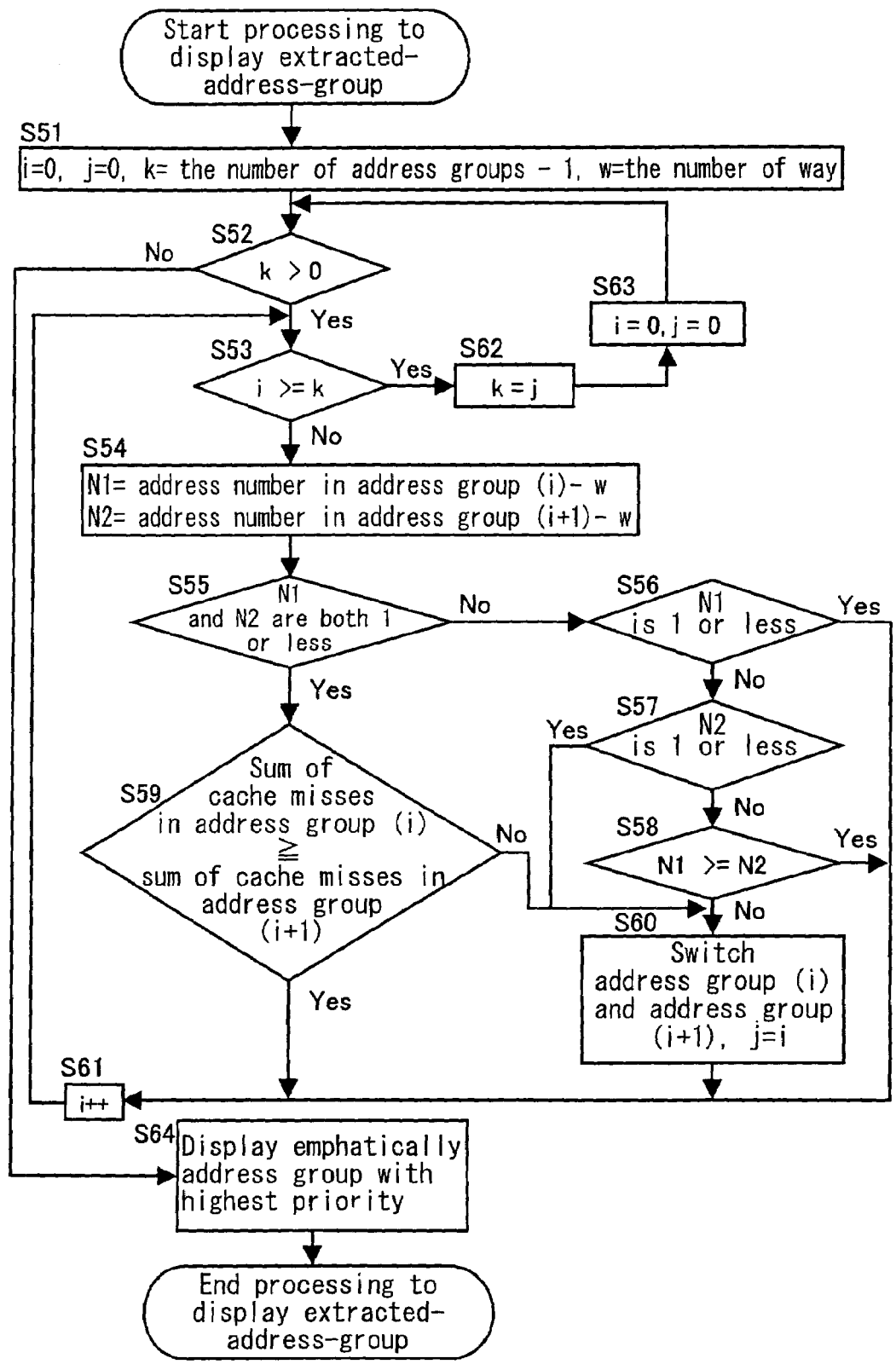
FIG. 7 is a flowchart of display processing for extracted-address-group according to the embodiment of the present invention, considering the number of addresses in the extracted-address group.
Figure 11:
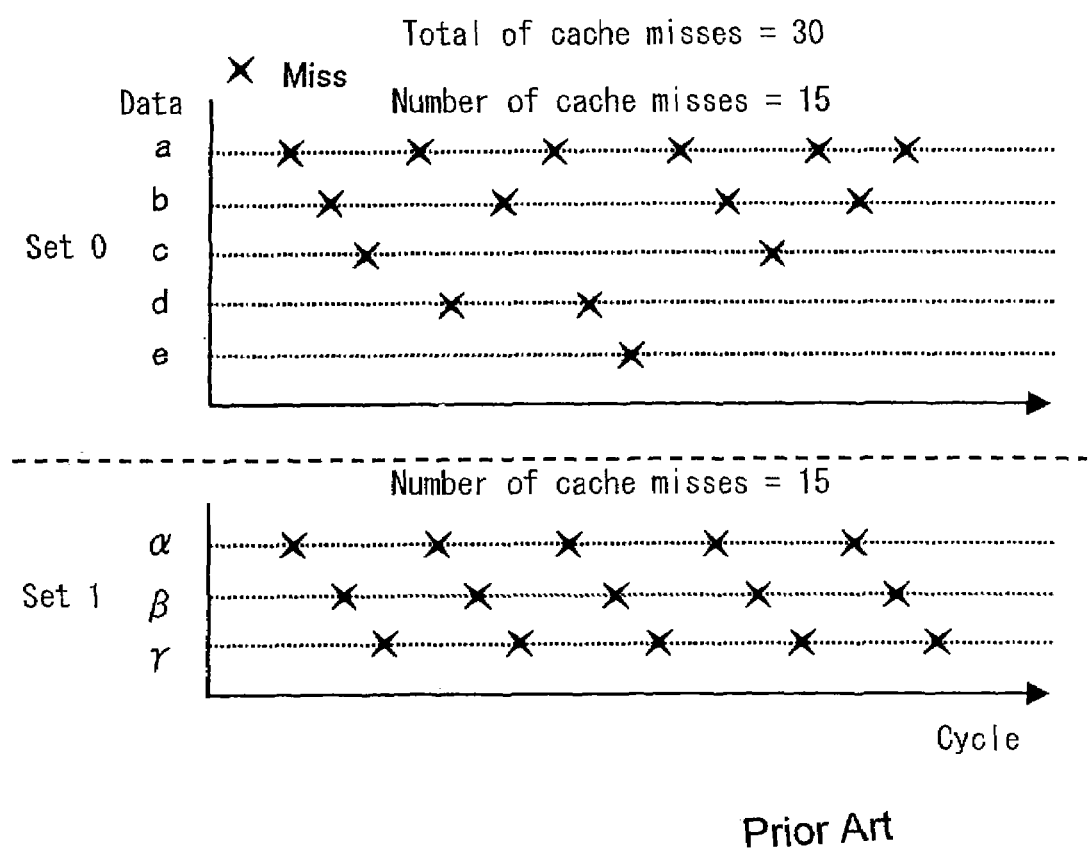
FIG. 11 is an illustration for describing the cache-miss access state of a related art.
Figure 12A:
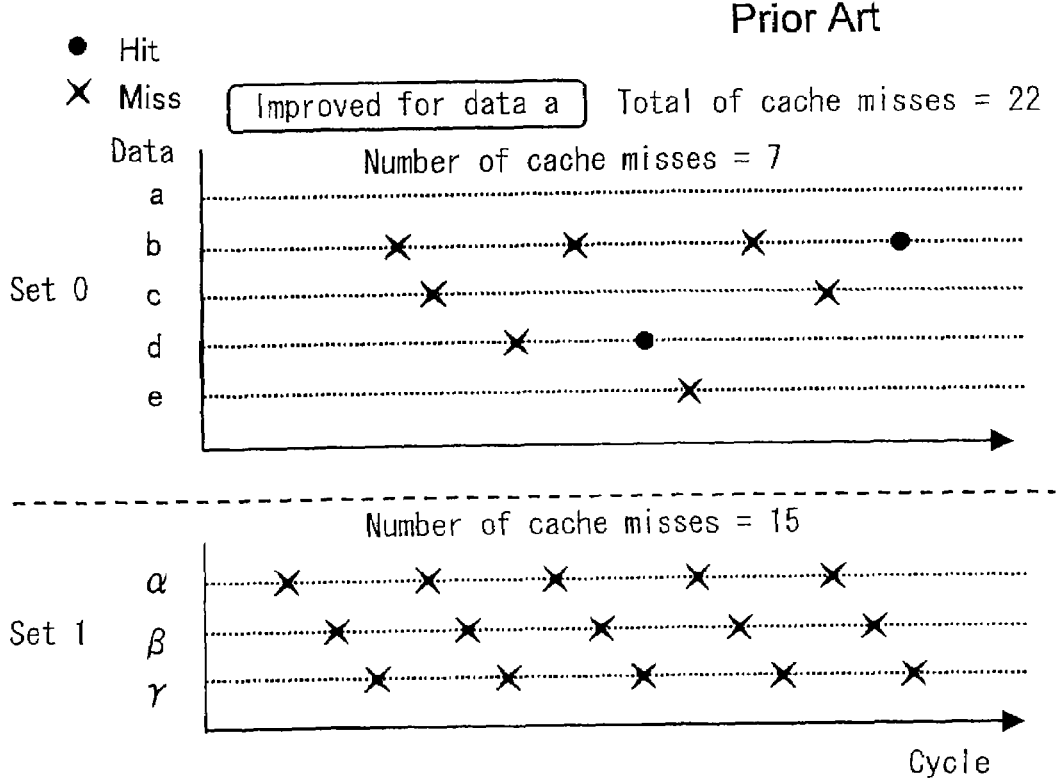
FIG. 12A is an illustration for describing the result when the number of cache misses is reduced in the related art.
Figure 12B:
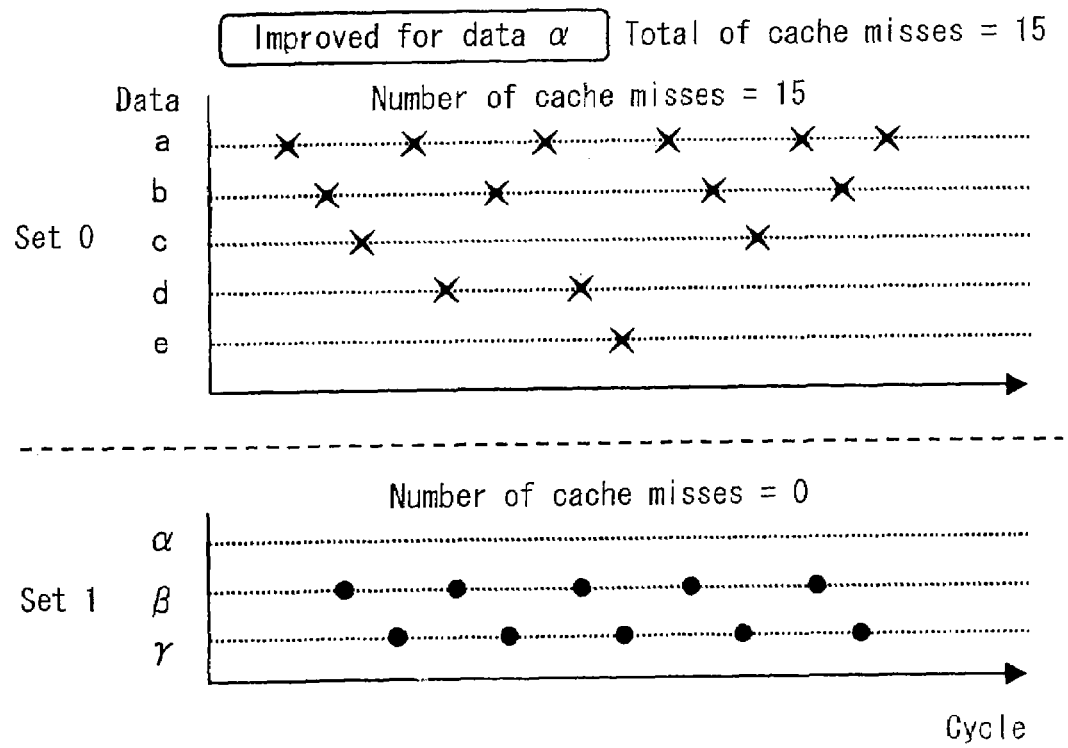
FIG. 12B is an illustration for describing the result when the number of cache misses is reduced in the related art.

FIG. 6 and FIG. 7 illustrate the details of step S6. Step S6 can be replaced with each processing shown in FIG. 6 and FIG. 7. First, the display processing for extracted address group shown in FIG. 6 is described by referring to the result shown in FIG. 10.

The order of the first address group in combination of the set 0 and the set 1 together is A→B→C→D→E→F. In step S31, a variable used in the sort processing is initialized. In this case, i indicates the counted number when the number of address groups are counted, j indicates the number of the address group after completing division, and k indicates the variable for judging that the sectionalizing processing has completed. As the initial value of the variable k, (the number of address groups—1) is set. The variable k is counted down every time one of the series of processing is completed, and the sort processing ends when it becomes "0". It is assumed here that the initial value of the variable k is set as "5" since the total of the address groups in FIG. 10 is "6".

Then, proceed to step S32 and it is judged whether or not the sort processing has completed. This judgment is performed by checking whether or not the variable k has reached 0 (k>0). Assuming that the initial value of the variable k is "5", it is judged as true in step S32 right after starting the processing and the process proceeds to step S33. In step S33, it is judged whether or not the sort processing of the address group has been completed until a lot of the last address of the group based on the magnitude relation between the counted number i and the variable k. Specifically, if it is i≧k, it is judged that the sort processing of the address group has been completed until the lot of the last address of the group. If not, it is judged that the sort processing of the address group has not been completed until the lot of the last address of the group. When it is assumed that the initial value of the variable k is "5", i=0 and k=5 right after starting the processing. Thus, it is judged in step S33 as false. When judged as false in step S33, it proceeds to step S34-step S38.

In step S34, the number of addresses in the address group i (the address group A right after starting the processing in the case of FIG. 10) is compared to the number of addresses in the next address group i+1 (the address group B right after starting the processing in the case of FIG. 10). Right after starting the processing in the case of FIG. 10, the number of addresses in the address group A is "4" and that of the address group B is "3", which are different from each other. Thus, it is judged in step S34 as false, and the process proceeds to step S35. In step S35, the number of addresses in the address group A is "4" which is lager than "3", the number of the address group B (the number in i>the number in i+1). Thus, it is judged as true in step S35, and the process proceeds to step S37.

The orders of the address group i and the address group i+1 are switched in step S37. Then, it proceeds to step S38. Specifically, the order of address group i→the address group i+1 as the initial order of the address groups is changed as the address group i+1→the address group i. Assuming that the address group i (the address group A) and the address group i+1 (the address group B), the order after the change becomes the address group B→the address group A.

The lot of address groups as the target of sort processing is switched to the next lot of address groups in step S38. Then, the process returns to step S33. Specifically, the processing of step S38 is the processing for increscenting the counted number i by "1". Now, it is considered the case where the processing of step S38 is performed after carrying out the processing of step S37. In this case, as the order of the address groups is changed to B→A→C→D→E→F, the target address group become the address group A and the address group C when the count number "i" is made increment in the step 38.

It is considered about the case where the counted number i is incremented from "0" to "1" in step S38. In this case, as it is i=1 and k=5, it is judged as false in step S33, and the process proceeds to step S34.

In this case, for the comparison of the numbers of the addresses in steps S34 and S35 based on the number of the addresses "4" in the address group A, and the number of the addresses "2" in the address group C, it is judged as false in step S34 and judged as true in step S35. Then, it proceeds to step S37.

The orders of the address group i and the address group i+1 are switched in step S37. Then, it proceeds to step S38. Assuming that the address group i (the address group A) and the address group i+1 (the address group C), the order after the change is the address group C→the address group A.

The lot of address groups for performing sort processing is switched to the next lot of address groups in step S38. Then, it returns to step S33. Specifically, the counted number i is incremented by "1". In this case, the processing of step S38 is performed after carrying out the processing of step S37. Thus, the target address group become the address group A and the address group D when the count number "i" is made increment in the step 38.

It is considered the case where the counted number i is incremented from "1" to "2" in step S38. In this case, as it is i=2 and k=5, it is judged as false in step S33 and proceed to step S34. In this case, for the comparison of the numbers of the addresses in steps S34 and S35 based on the number of the addresses "4" in the address group A, and the number of the addresses "4" in the address group D, it is judged as true in step S34. Then, it proceeds to step S36. As shown in FIG. 10, the total number of the cache misses generated in the group A is "198" and that of the address group D is "239". Thus, it is judged as false in step S36, and the process proceeds to step S37.

The orders of the address group i and the address group i+1 are switched in step S37. Then, it proceeds to step S38. Assuming that the address group i (the address group A) and the address group i+1 (the address group D), the order after the change becomes the address group D→the address group A.

The lot of address groups as the target of sort processing is switched to the next lot of address groups in step S38. Then, it returns to step S33. Specifically, the counted number i is incremented by "1". In this case, the processing of step S38 is performed after carrying out the processing of step S37. Thus, the target address group become the address group A and the address group E when the count number "i" is made increment in the step 38.

There will be considered the case where the counted number i is incremented from "2" to "3" in step S38. In this case, i=3 and k=5. Thus, it is judged as false in step S33 and proceeds to step S34.

In this case, for the comparison of the numbers of the addresses in steps S34 and S35 based on the number of the addresses "4" in the address group A and the number of the addresses "2" in the address group E, it is judged as false in step S34 and judged as true in step S35. Then, it proceeds to step S37.

The orders of the address group i and the address group i+1 are switched in step S37. Then, it proceeds to step S38. Assuming that the address group i (the address group A) and the address group i+1 (the address group E), the order after the change is the address group E→the address group A.

The lot of address groups as the target of sort processing is switched to the next lot of address groups in step S38. Then, it returns to step S33. Specifically, the counted number i is incremented by "1". In this case, the processing of step S38 is performed after carrying out the processing of step S37. Thus, the target address group become the address group A and the address group F when the count number "i" is made increment in the step 38.

Through repeatedly performing such processing further, the order of the address group A is switched with the orders of the address group E and the address group F. Therefore, the order becomes B→C→D→E→F→A. In that state, it becomes i=5 and j=4.

Returning to step S33 again, as it is i=5 and K=5, it is judged in this step as true. Then it proceeds to step S39 and S40 to perform the processing of these steps and then it becomes i=0, j=0, and k=4. Thereby it proceeds to step S34 after going through step S32 and step S33. In this state, as i returns to 0, the division processing returns to the first lot of the address groups. In this case, the first lot of the address groups becomes the address group B and the address group C.

In step S34, the number of the addresses in the address group B and that of the address group C are compared. As the processing hereafter is based on the above-described processing, the description thereof is omitted.

By repeating such processing, the order of the address groups finally becomes E→C→F→B→D→A. Then, it proceeds to step S41. Like this, the address group E is the address group with the highest efficiency for reducing the cache miss, i.e. the address group with the highest priority.

In step S41, the address group E with the highest priority is displayed emphatically. The address group C and the address group F having the same number of addresses as the address group E may be displayed emphatically as well.

A supplementary explanation of the final order of the address groups (E→C→F→B→D→A) is provided. The number of addresses in the address group E judged as having the highest priority as well as the numbers of addresses in the address groups C and F having the same number of the addresses as the address group E are all "2". The number of addresses in the address group B is "3". The number of addresses in the address groups D and A is "4". Like this, in the final order of the address groups, the groups are sectionalized by each of the groups with the same number of addresses. Then, those address groups are arranged in an ascending order as (E, C, F)→(B)→(D, A).

The address groups sectionalized into the group with the same number of the addresses are further arranged in a descending order regarding the total number of generated cache misses. That is, in the address groups E, C, and F with "2" addresses, the totals of the generated cache misses are respectively "60" (=30+30), "15" (=8+7), and "7" (=5+2) in this order. Thus, the address groups E, C and F are arranged in order of E→C→F according to the descending order of the total of the generated cache misses.

Meanwhile, in the address groups D and A with "4" addresses, the totals of the generated cache misses are respectively "239" (=62+60+60+57) and "198" (=50+50+50+48) in this order. Thus, the address groups D and A are arranged according to the descending order of the total of the generated cache misses.

As described, the small number of addresses is considered as the first priority and the large total number of generated cache misses is considered as the second priority. It becomes possible according to this flow to detect the address group with the highest efficiency for reducing the cache miss by considering how small the number of address groups belonging to the address group and how large the total of the cache misses generated therein, even when there are a plurality of address groups having memory access contention.

Further, it is possible to present the address with the highest efficiency for reducing the cache miss visually through displaying emphatically the address group with the highest efficiency for reducing the cache miss. The sort processing is performed together on the set 0 and set 1 herein. However, the sort processing may be performed by each set and the result thereof may be displayed emphatically.

As described above, in the display processing for the extracted address group step S6 described by referring to FIG. 6, the steps S31-S40 are executed by an extraction device of the busy condition analyzer for cache memory 37, and step S41 is executed by a display device (not shown) of the busy condition analyzer for cache memory 37.

Next, the display processing for the extracted address group where the number of ways is considered as shown in FIG. 7, is described by referring to the result shown in FIG. 10. The number of the way is indicative of how many the blocks for storing the data there are within the cache memory. The processing in FIG. 7 is a modification of the processing shown in FIG. 6. Thus, there exists the same processing in the flow chart of FIG. 7 as that of the flowchart of FIG. 6. That is, step S52 (FIG. 7) is the same processing as step S32 (FIG. 6), step S53 (FIG. 7) as step S33 (FIG. 6), step S59 (FIG. 7) as step S36 (FIG. 6), step 60 (FIG. 7) as step S37 (FIG. 6), step S61 (FIG. 7) as step S38 (FIG. 6), step S62 (FIG. 7) as step S39 (FIG. 6), step S63 (FIG. 7) as step S40 (FIG. 6), and step S64 (FIG. 7) as step S41 (FIG. 6), respectively. Therefore, detailed explanations of each step shown in FIG. 7 will be omitted.

First, initialization of each variable used on the sectionalizing processing is performed in step S51. In the processing of step S51, the number of way w of each set is set in addition to the counted number i, the address group number j, and the variable k set in step S31 of FIG. 6. It is assumed here that they are set as i=0, j=0, k=5, and w=2, respectively.

Then, it proceeds to step S54 after the processing of step S52 and step S53. In step S54, N1 and N2, which are differences between the numbers of addresses in the address groups i and i+1, and the numbers of way w, are calculated, respectively. In the cache memory of a set associative system that comprises two sets, there the cache blocks as much as the number of ways, w, exist in each set. Thus, if the difference between the number of addresses and the way number w is "1" or less, the following can be said. That is, in this case, when the cache misses generated at one of the addresses that have memory access contention is solved by changing the address arrangement or the like, it is highly possible for the cache misses at the other addresses having the memory access contention to be solved simultaneously. Based on such viewpoint, the above-mentioned difference N1 and N2 are used in step S54 as the index for determining the priority of the extracted address group.

The processing will be described hereinafter on an assumption that the address group i is the address group A and the address group i+1 is the address group B right after starting the processing. In the processing, it becomes N1=2 and N2=1. That is, since the number of the addresses in the address group A is "4" and the number of way w is "2", it is N1=4−2=2. Meanwhile, since the number of the addresses in the address group B is "3" and the way number w is "2", it is N2=3−2=1.

Only N2 is "1" or less, so that it proceeds to step S60 after the processing of step S56→step S57. In step S60, the orders of address group A and the address group B are switched. Then, it proceeds to step S61. In step S61, the lot of address groups for sectionalizing processing is changed to the next lot of address groups. Then, it returns to step S53 and continues the above-described processing.

When the sectionalizing processing is completed until the last lot of the address groups, the order of the respective address groups becomes B→C→A→E→F→D. At this time, it becomes i=5 and j=4.

In the state where the address groups have been the above-described order, as it becomes i=5 and k=5, it is judged as true in step S53 that is performed thereafter, and it proceeds to step S62 and step S63 for performing the respective processing. As a result of the processing of step S62 and step S63, it is i=0, j=0 and k=4, and then it proceeds to step S54→step S55 after the processing of step S52→step S53. In step S54, the address group i is the address group B and the address group i+1 is the address group C, in which it becomes N1=1 and N2=0 respectively. Since both N1 and N2 are "1" or less, it is judged as true in step S55, and the process proceeds to step S59.

Since the total of the cache misses generated in the address group B is "52" (=18+18+16) and the total of the cache misses generated in the address group C is "15" (=8+7), it is judged as true in step S59. Then, it proceeds to step S61.

By repeating above-described processing, the order of the address groups finally becomes E→B→C→F→A→D. That is, the address group E becomes the address group with the highest efficiency for reducing the cache miss, i.e. the address group with the highest priority. Therefore, the address group E is displayed emphatically as the address group with the highest priority. When there is a plurality of address groups with the same priority, the plurality of address groups may be displayed emphatically.

Through the above-described processing shown in FIG. 7, it becomes possible to detect the address group with the highest efficiency for reducing the cache miss even when there are a plurality of address groups having memory access contention, by considering the number of address groups belonging to the address group, the total of the generated cache misses, and the way number.

Furthermore, it is possible to indicate the address with the highest efficiency for reducing the cache miss visually through displaying emphatically the address group with the highest efficiency for reducing the cache miss. The sort processing is performed together in the set 0 and set 1, but the sort processing may be performed by each set and the division result may be displaying emphatically.

The present invention has been described in detail by referring to the most preferred embodiments. However, various combinations and modifications of the components are possible without departing from the sprit and the broad scope of the appended claims.

What is claimed is:

1. A cache memory analyzing method for analyzing condition of a cache memory in a processor comprising a CPU and said cache memory, said cache memory being a set associative system cache memory having a plurality of data storage blocks for each set that is distinguished from other memory areas by a lower bit of a memory-access address, and the CPU being configured to perform recording control of the cache memory, the method comprising steps of:

a reading step for reading information from the cache memory, the information containing an address of the cache memory at which a cache miss is generated;

a totalizing step for totalizing numbers of cache misses generated at each of the address at which the cache miss is generated, the address being contained in the information;

a sectionalizing step for sectionalizing, by each of the sets, the addresses at which the cache miss is generated and whose numbers of the cache miss are totalized;

an extraction step for extracting an address group, the address group being a group of the addresses whose numbers of cache miss are equal or close to each other from a plurality of the addresses at which the cache miss is generated, the addresses being sectionalized as addresses of a same set; and a designating step for designating numbers of the data storage blocks for each set as a pre-processing of the extraction step, wherein, in the extraction step, when there is a plurality of the address groups divided in a same set, the plurality of the address groups are divided by giving high priority to the address groups that have a value of 1 or less, the value being a number that a number of the data storage block is subtracted from a number of the addresses contained in each of the address groups.

2. The cache memory analyzing method according to claim 1, further comprising a step of:

a display step for displaying an extraction result of the address group extracted in the extraction step as an analysis result.

3. The cache memory analyzing method according to claim 1, wherein the extraction step further comprising:

a threshold value setting step for setting a threshold value as an upper limit for a difference between the numbers of the cache miss totalized in the totalizing step when extracting the group of the addresses;

wherein the addresses sectionalized within the same set are divided into the group of the addresses based on whether or not the difference between the numbers of the cache miss falls within the threshold value.

4. The cache memory analyzing method according to claim 3, wherein the threshold value is set as a boundary value to determine whether or not there is possibility to cause contention of memory access by data between the addresses.

5. The cache memory analyzing method according to claim 3, wherein the threshold value is set arbitrarily in the extraction step.

6. The cache memory analyzing method according to claim 1, wherein, in the extraction step, when a plurality of the address group within a same set is extracted, the plurality of the address groups are divided by being arranged in order of numbers of the addresses contained in the relevant address groups.

7. The cache memory analyzing method according to claim 6, wherein, in the extraction step, when a plurality of the address groups containing same number of addresses within a same set is extracted, the address groups having the same number of addresses are divided by being arranged in order of total number obtained by totalizing the numbers of the cache misses at the addresses contained in the address groups at each of the address groups.

8. The cache memory analyzing method according to claim 6, further comprising a display step for displaying an extraction result of the address group extracted in the extraction step as an analysis result, wherein, in the display step, the address group having the least number of addresses in the extraction step is displayed emphatically as an address group with a high efficiency for reducing cache miss.

9. The cache memory analyzing method according to claim 1, wherein, in the extraction step, when there are a plurality of the address groups that have the value of 1 or less, the plurality of the address groups are divided by being arranged in order of total number obtained by totalizing the numbers of the cache misses at the addresses at each of the address groups.

10. The cache memory analyzing method according to claim 1, further comprising a display step for displaying an extraction result of the address group extracted in the extraction step as an analysis result, wherein, in the display step, the address group sectionalized as having a high priority in the extraction step is displayed emphatically as an address group with a high efficiency for reducing cache miss.

11. A cache memory analyzing apparatus for analyzing condition of a cache memory in a processor comprising a CPU and the cache memory, the cache memory being a set associative system cache memory having a plurality of data storage blocks for each set that is distinguished from other memory areas by a lower bit of an memory-access address, and the CPU being configured to perform recording control of the cache memory, the apparatus comprising:

a reading device for reading information from the cache memory, the information containing an address of the cache memory at which a cache miss is generated;

a totalizing device for totalizing the numbers of cache misses generated at each of the address at which the cache miss is generated, the address being contained in the information;

a sectionalizing device for sectionalizing, by each the set, the addresses at which the cache miss is generated and whose numbers of the cache miss are totalized;

an extraction device for extracting an address group, the address group being a group of the addresses whose numbers of cache miss are equal or close to each other from a plurality of the addresses at which the cache miss is generated, the addresses being sectionalized as addresses of a same set; and a designating device for designating numbers of the data storage blocks for each set, wherein, the extraction device, when there is a plurality of the address groups divided in a same set, divides the plurality of the address groups by giving high priority to the address groups that have a value of 1 or less, the value being a number that a number of the data storage block is subtracted from a number of the addresses contained in each of the address groups.

* * * * *